UNITED STATES PATENT OFFICE.

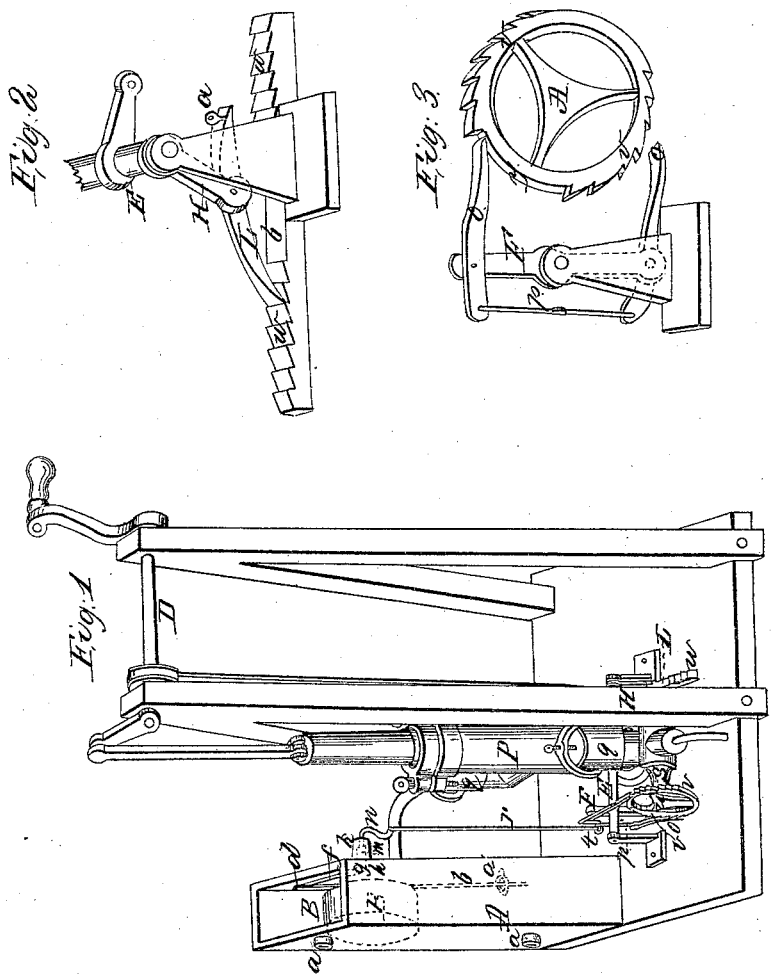

WARREN S. BARTLE, OF NEWARK, NEW YORK.

REGULATING THE SUPPLY OF WATER IN STEAM-BOILERS.

Specification of Letters Patent No. 6,105, dated February 6, 1849.

*To all whom it may concern:*

Be it known that I, WARREN S. BARTLE, of the village of Newark, in the county of Wayne and State of New York, have invented a new and Improved Self-Acting Apparatus for Maintaining the Water in Steam-Boilers at a Uniform Height; and I do hereby declare that the following is a full and exact description of the construction and operation of the same, reference being had to the accompanying drawings, making a part of this specification.

The many contrivances heretofore resorted to by others to regulate the supply of steam boilers with water through the agency of a float have mostly if not wholly failed on account of the uncertainty of their operation and their consequent insecurity. This uncertainty has arisen mainly from the attachment of the connecting rod from the float directly to the spindle of the valve, or the stem of the cock checking the flow of water to the boiler, or to a clutch starting and stopping the pump, thus requiring of the float an exertion of power which it does not and cannot possess. For, the parts of metal composing the cock, or valve and spindle, often unequally contract and expand by change of temperature, so that at one time a much greater force is requisite to move them than at another. At other times for the same reason they require a greater force to move them than the float possesses. Sometimes they become immovable by the float in consequence of the collection about them of sediment or earthy particles suspended in the water. Sometimes from rust, or from being too tightly fitted by a turn of a screw after having leaked, they offer a resistance too great to be overcome by the direct action of the float. It is only when the motive power of the float is proportionately great and the resistance offered is extremely small that its certainty of result can be depended upon.

By my arrangement the greatest disproportion possible between the power applied and the resistance to be overcome is secured. The capacity of the float is large and the connecting rod from its instead of being directly attached to the valve spindle, cock stem, or clutch, is attached to equally balanced and nicely poised clicks, which operate on them, so that the power required to be exerted by the float is simply to raise or depress these clicks—a task requiring the slightest force conceivable. And to insure certainty that the cock, valve, or clutch will move the required distance and at the required time, there must be a greater disproportion between the power that moves them and the resistance they ordinarily offer than can be obtained by the direct attachment of the float to them.

By my arrangement the power applied to them, instead of being equal simply and only to the direct force of the float, is commensurate with that of the engine itself, and is sufficient to move them under any emergency.

The nature of my invention consists in regulating the quantity of water forced into steam boilers and thus maintaining it at a uniform height therein by means of a float placed in the boiler or in a chamber communicating with it, which float by its rising and falling directs the points of one or more clicks moved longitudinally to and fro by the engine, alternately upon or away from adverse ratchets attached either to a cock in the pump, so as to turn the cock alternately one way and the other, and admit and shut off the water in its passage to the boiler, the pump all the while moving, or, to a lever moving a clutch or other device which stops and starts the wheel, pulley, or shaft that drives the pump, and thus starts and stops the pump.

To enable others skilled in the art to make and use my self-acting apparatus I will proceed to describe its construction and operation more fully.

For the purpose of avoiding the commotion on the surface of the water in the boiler produced by ebullition and of having the float rest upon still water I construct a reservoir, A, Fig. 1, which is shown with the top off to exhibit the float &c., which I call a float chamber, of cast iron or other fit material of any convenient shape, large enough laterally to contain the float and the arm and rod with which it is connected, and of sufficient extent vertically to allow of the requisite elevation and depression of the float. This chamber I attach to the boiler at any convenient place by two pipes, *a a* Fig. 1, or two sets of pipes, one pipe or set, below the water line in the boiler so as always to maintain a communication between the water in the boiler and the water in the float chamber, and the other pipe or set above the water line so as always to maintain a communication between the steam in the boiler and the steam in the chamber. This arrangement keeps the water in the boiler and that in the float chamber always at the same height. On the surface of the water within this chamber I place a float, B, Fig. 1, made of sheet copper or other suitable material in any convenient form, hollow, filled with atmospheric air, of sufficient strength to resist the pressure of the steam, and of sufficient weight and extent to keep its place at all times on the surface of the water as it rises and falls, and thus to move the parts of the apparatus attached to it. To this float I make fast a stiff wire or small rod, b, Fig. 1, letting one end of it for the purpose of keeping the float steady and in place, pass down below the float, loosely through a staple, eye, or ring fixed to the side of the chamber. The other end of the wire or rod extends upward above the float and is attached by a free flexible joint, d, Fig. 1, made in any of the usual ways to the arm, f, Fig. 1, of a crank the axis, g, Fig. 1, of which, passes from the inner side of the chamber, as at h, Fig. 1, through to the outer side at right angles to the side. This arm is turned at right angles to the axis of the crank or nearly so, and when the water is at the requisite height in the boiler, lies in a horizontal direction.

For the purpose of having a steam tight joint, the axis of the crank is made to pass through a short cylinder, k, Fig. 1, attached to the chamber, the caliber of which, is of two different dimensions being longest in that part next the chamber and smallest in that part farthest from it. The difference of caliber is made at one point, m, Fig. 1, and at right angles to the direction of the caliber forming a rest for a shoulder on the axis of the crank. The axis of the crank is made to just fit within the cylinder and consequently a shoulder upon it meets the rest above mentioned, m, Fig. 1, so that by the pressure of the steam a steam tight joint is formed. On the outside of the chamber is another arm, n, Fig. 1, to the crank, which arm is turned at an angle to the one in the chamber see f and n Fig. 1.

To a rocking shaft E, Fig. 1, moved in the usual way by a crank or an eccentric, a cross bar or double arm F, Fig. 1, is fixed, the extremities of which vibrate as the shaft rocks. This cross bar is fixed at its center to the shaft and at right angles thereto. At the extremities of the cross bar at right angles to it or nearly so, are fixed by common pin joints clicks o, o, Figs. 1 and 3. These clicks are balanced as near as may be upon the joint pins. The rear ends of them are connected together and kept at a uniform distance apart by a small rod p, Figs. 1 and 3, with free joints at the points of attachment. The rear ends of these clicks and the outside arm of the float crank are connected by free joints by a rod r, Fig. 1, as at Fig. 1, so that by the rising or falling of the float the points or forward ends of the clicks are simultaneously and equally moved and thus but one click can act on the ratchet at once, see Fig. 3.

To a stop cock made in the ordinary way placed across the caliber and below the valves of the force pump P, Fig. 1, that supplies the boiler, which pump is kept in constant operation, a small wheel u, Fig. 1, in diameter nearly equal to the length of the cross bar, is fixed, having at its circumference on opposite sides two ratchets v, Figs. 1 and 3, the teeth of which point in opposite directions and which I call adverse ratchets. These ratchets are of such length and so located on the circumference of the wheel as to cause the cock to be turned in one direction far enough only to open it, and in the other far enough only to shut it; for when it is thus far turned the point of the acting click reaches the end of the ratchet and moves on a smooth portion of the circumference of the wheel y, Figs. 1 and 3, without further turning it. Consequently when the water in the boiler, and with it the float falls, the click designed to open the cock is brought in contact with its appropriate ratchet and the other is directed away from the adverse ratchet, which partly or wholly opens the cock. And when the water in the boiler rises so high as to cause the float to change the action of the clicks, the click designed to shut the cock is brought in contact with its appropriate ratchet, which partly or wholly shuts the cock; and so on alternately preventing or allowing the water a passage through the pump to the boiler according as it rises or falls within it; consequently maintaining it at nearly a uniform height.

When the current of the water through the pump is required to be continuous and is to be admitted to, or diverted from the boiler by a three way cock, the cock should be placed above the valves. And when it is required to start and stop the current through the pump by the admission of air into the pump the cock should be placed between the valves.

The foregoing is a description of the construction and operation of my apparatus when designed to regulate the height of the water in the boiler without at any time for that purpose stopping the force pump that feeds the boiler. But with a modification of a part of the apparatus as hereinafter set forth I accomplish in a simple manner the same object by alternately starting and stopping the pump. The float chamber, the float, the rocking shaft, and the rod communicating the action of the float are the same as before described; but instead of the cross bar F I attach to the rocking shaft a single arm H, Figs. 1 and 2, at the extremity of which is balanced on its center and secured by a free pin joint a double click L, Figs. 1 and 2, which acts upon two adverse ratchets $w$ $w$, Figs. 1 and 2, made on a single straight bar. To this click by a free joint between the center and one of the points as at $a$, Fig. 2, a rod is attached which connects with the outer arm of the float crank in the same manner as hereinbefore described. On the bar between the ratchets is a plain smooth space $b$, Fig. 2, as on the circular ratchet above described and for the same purpose. The points of this click are alternately directed upon and away from the ratchets by the rising and falling of the float in the same manner as those of the clicks acting on the circular ratchets above described, and the ratchet bar is moved alternately in one direction and then in the opposite in the same manner also.

The ratchet bar is kept in place by fixing its ends to slide in orifices or in any other convenient way and is made to start and stop the pump by being applied at one of its ends to a lever that moves a common clutch or other suitable device which starts and stops the shaft wheel or pulley that drives the pump.

In some kinds of boilers the commotion of the surface of the water is so slight that the float may be placed directly in the boiler, and in such case for the purpose of giving sufficient room for the action of the float and of having the axis of the float crank above the surface of the water I heighten a section of the space above the water in the boiler by attaching directly to its upper side or if it be a vertical one to its upper end a steam chamber with a communication between, equal in extent to a cross section of the chamber, into which the float may rise, and through the side of which the float crank passes.

Having thus described my self acting apparatus for maintaining the water in steam boilers at a uniform height I here declare that I do not claim the float as a part of my invention the same having before been known and used in steam boilers. Neither do I claim the chamber in which said float is placed, nor the crank on the float rod, nor in fact any such apparatus for regulating the height of water in boilers where motion is communicated directly to the cock stem, or valve spindle by the float; various modifications of such apparatus being well known. But

What I do claim as my invention and desire to secure by Letters Patent, is—

Regulating the feed in boilers by means of an arrangement of a float, a rocking shaft, kept in constant motion by the engine, vibrating clicks and circular or straight ratchets, acting upon the cock stem, valve spindle, or pump shaft, so that the float is required to exert no direct force to regulate the supply; the whole machinery constructed and acting substantially as above described.

WARREN S. BARTLE.

Witnesses:
 STEPHEN CULVER,
 JAMES P. BARTLE.